(No Model.)

G. P. McCONNELL.
BELT REPLACING DEVICE.

No. 244,279. Patented July 12, 1881.

Attest.
P. S. Knight
L. M. Hopkins

Inventor.
Geo. P. McConnell
By Knight Bros. Attys.

N. PETERS, Photo-Lithographer, Washington, D. C.

UNITED STATES PATENT OFFICE.

GEORGE P. McCONNELL, OF CINCINNATI, OHIO, ASSIGNOR OF ONE-HALF TO JOHN N. HOOK, OF NEWPORT, KENTUCKY.

BELT-REPLACING DEVICE.

SPECIFICATION forming part of Letters Patent No. 244,279, dated July 12, 1881.

Application filed May 23, 1881. (No model.)

*To all whom it may concern:*

Be it known that I, GEORGE P. McCONNELL, of Cincinnati, in the county of Hamilton and State of Ohio, have invented a new and useful Improvement in Belt-Replacing Devices, of which the following is a specification.

My invention is more especially intended to facilitate the replacement within the pulley-groove of the customary round belt of a sewing-machine, or to enable a new belt to be easily and quickly applied, the device being such as to cause the belt to automatically assume or resume its place upon the periphery of the scored pulley by the simple act of rotating the latter in the direction in which it revolves for ordinary work without manipulation of any sort. The application of an ordinary lug would necessitate the placing of the belt by hand behind the lug before the lug would operate to guide the belt into its groove.

My improvement consists in providing a scored pulley with a tooth of peculiar construction, so as to adapt it to automatically insert the belt in the groove of the pulley. To this end my tooth is formed with an out-turned portion or lip, which catches the belt as well as directs or guides it into place.

Figure 1:
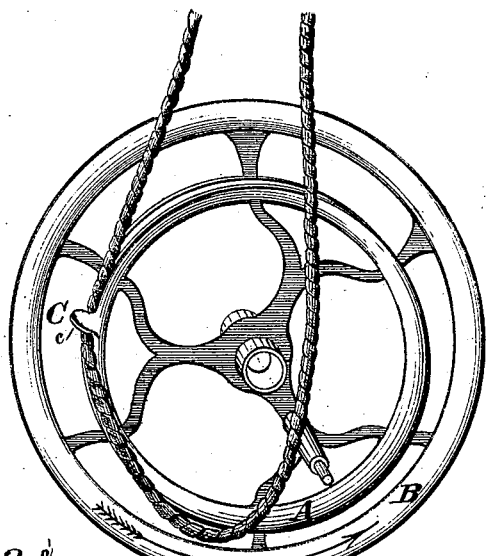
Figure 2:
Figure 5:
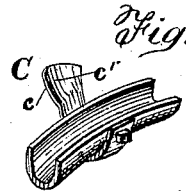
Figure 3:
Figure 4:
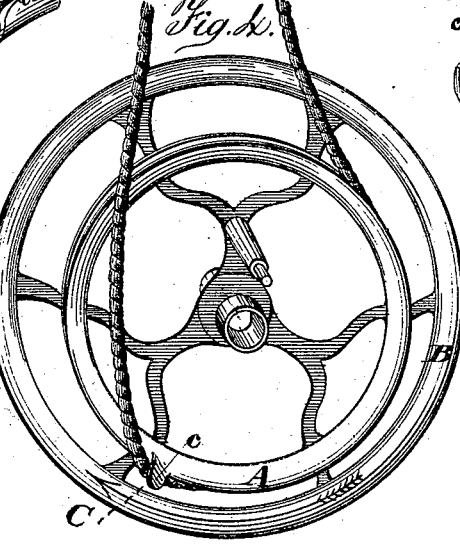
Figure 6:

In the accompanying drawings, Figure 1 represents a left-hand pulley provided with my improvement. Fig. 2 represents a small segment or portion of the pulley-rim with my belt-replacing device. Fig. 3 is a transverse section of the same. Fig. 4 represents a right-hand pulley provided with my improved tooth. Fig. 5 represents a portion of the pulley-rim with that form of my improvement whose belt-replacer consists of a separable finger bolted to the pulley-rim. Fig. 6 shows such finger detached.

A represents the customary scored driving-pulley of a sewing-machine. Projecting from the rim of this pulley, on the remote side from the fly-wheel B, is my belt-replacing tooth or finger C. This finger may be cast in one integral piece with the pulley, as shown in Figs. 1 to 4, inclusive, or may constitute a separable appendage, as shown in Figs. 5 and 6; but whether cast, bolted, or otherwise affixed, it constitutes in use a rigid projection from the pulley.

In order to facilitate the automatic action of the tooth C, I form it with an out-turned portion or lip, c, whose face c' operates upon the disengaged belt after it has been caught by the lip of the tooth. The face is of spiral form, which becomes increasingly oblique to the plane of the pulley as it recedes therefrom.

By combining the teeth on the left and right pulleys a tooth would be formed with two lips extending in opposite directions, and adapted to replace the belt whichever way the pulley is revolved.

I am aware that it has been proposed to provide pulleys with adjustable appendages for the replacing of their belts, and I therefore lay no claim to such, broadly considered.

I am also aware that the idea has been suggested to provide a pulley with a projection or lug for guiding a belt onto the wheel, but no practical construction has been revealed.

As before stated, an ordinary lug would necessitate the engaging of the belt with such lug before it would insert the belt in the groove.

Having thus described my invention, the following is what I claim as new therein and desire to secure by Letters Patent:

A tooth or finger, C, formed with an out-turned portion or lip, c, presenting a spiral face, c', in combination with a belt-pulley, A, the said tooth or finger being rigidly attached in operative position, and its lip adapted to catch as well as direct the belt into its place, as set forth.

In testimony of which invention I hereunto set my hand.

GEO. P. McCONNELL.

Attest:
   GEO. H. KNIGHT,
   SAML. S. CARPENTER.